(12) United States Patent
Downs et al.

(10) Patent No.: US 10,704,663 B2
(45) Date of Patent: Jul. 7, 2020

(54) MODULAR DISCONNECTING DRIVE MODULE WITH TORQUE VECTORING AUGMENTATION

(71) Applicant: AMERICAN AXLE & MANUFACTURING, INC., Detroit, MI (US)

(72) Inventors: James P. Downs, South Lyon, MI (US); Paul J. Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 71 days.

(21) Appl. No.: 16/122,973

(22) Filed: Sep. 6, 2018

(65) Prior Publication Data

US 2020/0080625 A1    Mar. 12, 2020

(51) Int. Cl.
| | |
|---|---|
| F16H 48/22 | (2006.01) |
| F16H 48/34 | (2012.01) |
| F16H 48/38 | (2012.01) |
| F16H 48/32 | (2012.01) |

(52) U.S. Cl.
CPC ............ *F16H 48/22* (2013.01); *F16H 48/34* (2013.01); *F16H 48/32* (2013.01); *F16H 2048/343* (2013.01); *F16H 2048/385* (2013.01)

(58) Field of Classification Search
None
See application file for complete search history.

(56) References Cited

U.S. PATENT DOCUMENTS

| | | | |
|---|---|---|---|
| 696,704 | A | 4/1902 | Allen |
| 783,168 | A | 2/1905 | Baker |
| 899,891 | A | 9/1908 | Niclausse |
| 1,128,429 | A | 2/1915 | Fetzer |
| 1,362,361 | A | 12/1920 | Starr |
| 1,987,716 | A | 1/1935 | Skelton |
| 2,609,710 | A | 9/1952 | Osborn |
| 3,344,687 | A | 10/1967 | Stockton |
| 3,352,395 | A | 11/1967 | Hilpert |
| 3,385,133 | A | 5/1968 | Terao |
| 3,394,610 | A | 7/1968 | Szodfridt |
| 3,741,030 | A | 6/1973 | Asberg |

(Continued)

FOREIGN PATENT DOCUMENTS

| | | |
|---|---|---|
| CN | 201334012 Y | 10/2009 |
| DE | 01627594 A1 | 8/1970 |

(Continued)

*Primary Examiner* — Timothy Hannon
(74) *Attorney, Agent, or Firm* — Burris Law, PLLC (57) ABSTRACT

A drive module having a housing, an input pinion, a ring gear driven by the input pinion, a ring gear bearing supporting the ring gear for rotation relative to the housing, a pair of output shafts and a clutch that selectively transmits rotary power between the ring gear and the output shafts. The clutch includes a clutch input, which is rotatably coupled to the ring gear, a clutch plate separator that is rotatably coupled to the clutch input, a pair of clutch outputs, which are each coupled to a respective one of the output shafts, a pair of clutch packs, which transmit rotary power between the clutch input and a respective one of the clutch outputs, and a pair of apply pistons. The apply pistons are housed in the clutch plate separator.

16 Claims, 8 Drawing Sheets

(56) References Cited

U.S. PATENT DOCUMENTS

| | | | |
|---|---|---|---|
| 3,749,217 A | 7/1973 | Bush et al. | |
| 3,777,360 A | 12/1973 | Welch | |
| 3,792,625 A | 2/1974 | Asberg | |
| 3,905,457 A | 9/1975 | Shea | |
| 3,915,267 A | 10/1975 | Shea | |
| 4,004,472 A | 1/1977 | Millward et al. | |
| 4,182,201 A | 1/1980 | Mayhew et al. | |
| 4,381,828 A | 5/1983 | Lunn et al. | |
| 4,763,749 A | 8/1988 | Miura et al. | |
| 4,782,721 A | 11/1988 | Dick | |
| 4,862,988 A * | 9/1989 | Umemoto | B60K 17/348 180/246 |
| 4,875,978 A | 10/1989 | Hiketa | |
| 4,915,190 A | 4/1990 | Iwata | |
| 4,938,306 A | 7/1990 | Sumiyoshi et al. | |
| 5,041,069 A | 8/1991 | Horst | |
| 5,061,229 A | 10/1991 | Tsukamoto et al. | |
| 5,065,639 A | 11/1991 | Flanhardt et al. | |
| 5,069,305 A | 12/1991 | Kobayashi | |
| 5,083,986 A | 1/1992 | Teraoka et al. | |
| 5,098,355 A | 3/1992 | Long | |
| 5,105,901 A | 4/1992 | Watanabe et al. | |
| 5,105,902 A | 4/1992 | Wilson et al. | |
| 5,119,900 A * | 6/1992 | Watanabe | B60K 23/0808 180/245 |
| 5,156,247 A | 10/1992 | Wiese et al. | |
| 5,174,408 A | 12/1992 | Hock | |
| 5,188,194 A | 2/1993 | Gasch | |
| 5,203,750 A | 4/1993 | Oster et al. | |
| 5,234,072 A | 8/1993 | Chludek | |
| 5,314,039 A | 5/1994 | Hock | |
| 5,341,893 A * | 8/1994 | Fukui | B60K 17/348 180/245 |
| 5,411,110 A | 5/1995 | Wilson et al. | |
| 5,423,235 A | 6/1995 | Botterill et al. | |
| 5,484,033 A | 1/1996 | Frank et al. | |
| 5,503,494 A | 4/1996 | Kamata et al. | |
| 5,547,430 A | 8/1996 | Gasch | |
| 5,560,687 A | 10/1996 | Hagelthorn | |
| 5,562,566 A | 10/1996 | Yang | |
| 5,632,185 A | 5/1997 | Gassmann | |
| 5,662,543 A | 9/1997 | Forsyth | |
| 5,690,201 A | 11/1997 | Gassmann | |
| 5,706,923 A | 1/1998 | Gassmann | |
| 5,722,305 A * | 3/1998 | Sawa | B60K 23/04 74/650 |
| 5,762,578 A | 6/1998 | Forsyth | |
| 5,839,986 A | 11/1998 | Yamazaki | |
| 5,865,701 A | 2/1999 | Sowa et al. | |
| 5,913,745 A | 6/1999 | Inagaki et al. | |
| 5,935,036 A | 8/1999 | Gassmann et al. | |
| 5,951,428 A | 9/1999 | Itoh et al. | |
| 5,964,126 A | 10/1999 | Okcuoglu | |
| 6,056,663 A | 5/2000 | Fett | |
| 6,077,183 A | 6/2000 | Tar et al. | |
| 6,113,512 A | 9/2000 | Williams | |
| 6,116,392 A | 9/2000 | Gassmann | |
| 6,209,673 B1 | 4/2001 | Barlage et al. | |
| 6,241,067 B1 | 6/2001 | Hock | |
| 6,254,196 B1 | 7/2001 | Gee | |
| 6,263,995 B1 | 7/2001 | Watson et al. | |
| 6,267,214 B1 | 7/2001 | Kwoka | |
| 6,283,884 B1 | 9/2001 | El-Kassouf | |
| 6,394,246 B1 * | 5/2002 | Gassmann | F16D 43/284 192/103 F |
| 6,431,337 B1 | 8/2002 | Hock et al. | |
| 6,443,282 B1 | 9/2002 | Kwoka | |
| 6,446,773 B2 | 9/2002 | Kwoka | |
| 6,461,267 B1 | 10/2002 | Paielli | |
| 6,520,885 B2 | 2/2003 | Gassmann et al. | |
| 6,533,090 B2 | 3/2003 | Osborn et al. | |
| 6,540,634 B2 | 4/2003 | Thompson | |
| 6,544,140 B2 | 4/2003 | Gradu et al. | |
| 6,547,025 B1 | 4/2003 | Gassmann et al. | |
| 6,557,677 B2 | 5/2003 | Peura | |
| 6,582,334 B1 | 6/2003 | Noll | |
| 6,592,487 B2 | 7/2003 | Gassmann | |
| 6,616,565 B1 | 9/2003 | Chen et al. | |
| 6,623,396 B2 | 9/2003 | Szalony et al. | |
| 6,645,113 B2 | 11/2003 | Orr et al. | |
| 6,652,408 B2 | 11/2003 | Rutt et al. | |
| 6,681,913 B2 | 1/2004 | Lee | |
| 6,695,739 B2 | 2/2004 | Fett | |
| 6,699,154 B2 | 3/2004 | Orr et al. | |
| 6,702,707 B2 | 3/2004 | Krzesicki et al. | |
| 6,719,661 B2 | 4/2004 | Turner et al. | |
| 6,769,506 B2 | 8/2004 | Gassmann et al. | |
| 6,779,420 B2 | 8/2004 | Peura | |
| 6,805,653 B2 | 10/2004 | Krzesicki et al. | |
| 6,814,682 B2 | 11/2004 | Spitale | |
| 6,824,489 B2 | 11/2004 | Jacob et al. | |
| 6,827,663 B2 | 12/2004 | Tucker-Peake | |
| 6,849,017 B2 | 2/2005 | Nett | |
| 6,851,501 B2 | 2/2005 | Gassmann | |
| 6,863,634 B2 | 3/2005 | Holman et al. | |
| 6,863,684 B2 | 3/2005 | Kim et al. | |
| 6,896,463 B2 | 5/2005 | Tuthill | |
| 6,945,899 B2 | 9/2005 | Peura | |
| 6,974,400 B2 | 12/2005 | Williams | |
| 7,022,041 B2 | 4/2006 | Valente | |
| 7,086,983 B2 | 8/2006 | Turner et al. | |
| 7,094,172 B2 | 8/2006 | Ishikawa | |
| 7,150,694 B2 | 12/2006 | Mizon et al. | |
| 7,155,824 B2 | 1/2007 | Prucher | |
| 7,188,699 B2 | 3/2007 | Moore et al. | |
| 7,232,399 B2 | 6/2007 | Valente | |
| 7,314,416 B2 | 1/2008 | Loughrin et al. | |
| 7,331,896 B1 | 2/2008 | Kroppe | |
| 7,393,301 B2 | 7/2008 | Green, Jr. | |
| 7,452,301 B2 | 11/2008 | Yoshioka | |
| 7,500,934 B2 | 3/2009 | Ziech | |
| 7,520,833 B2 | 4/2009 | Honda et al. | |
| 7,533,754 B2 | 5/2009 | Burrows et al. | |
| 7,775,928 B2 | 8/2010 | Zink | |
| 7,901,318 B2 | 3/2011 | Downs et al. | |
| 7,984,782 B2 | 7/2011 | Platt et al. | |
| 8,167,758 B2 | 5/2012 | Downs et al. | |
| 8,215,440 B2 | 7/2012 | Hoffmann et al. | |
| 8,616,780 B2 | 12/2013 | Kwasniewski et al. | |
| 8,951,159 B2 | 2/2015 | Fox et al. | |
| 9,346,354 B2 | 5/2016 | Valente | |
| 9,366,354 B2 | 6/2016 | Nanahara et al. | |
| 9,598,069 B2 | 3/2017 | Kato | |
| 9,688,141 B2 | 6/2017 | Takaishi et al. | |
| 9,731,597 B2 | 8/2017 | Zink | |
| 9,981,552 B2 | 5/2018 | Ogawa et al. | |
| 2002/0032096 A1 | 3/2002 | Gassmann | |
| 2003/0070501 A1 | 4/2003 | Bell | |
| 2003/0089185 A1 | 5/2003 | Hock et al. | |
| 2003/0166432 A1 | 9/2003 | Patzer et al. | |
| 2003/0186774 A1 | 10/2003 | Sullivan | |
| 2003/0211913 A1 | 11/2003 | Spitale | |
| 2003/0236147 A1 | 12/2003 | Fett | |
| 2004/0162179 A1 | 8/2004 | Krzesicki et al. | |
| 2004/0198548 A1 | 10/2004 | Showalter et al. | |
| 2005/0023063 A1 | 2/2005 | Mueller | |
| 2005/0101430 A1 | 5/2005 | Ziech | |
| 2005/0245342 A1 | 11/2005 | Pontanari et al. | |
| 2006/0254382 A1 | 11/2006 | Ebihara | |
| 2006/0283654 A1 | 12/2006 | Krisher | |
| 2007/0289797 A1 | 12/2007 | Bowen | |
| 2008/0128234 A1 | 6/2008 | Mogami et al. | |
| 2008/0305910 A1 | 12/2008 | Brasile et al. | |
| 2008/0318725 A1 | 12/2008 | Waksmundzki | |
| 2009/0160274 A1 | 6/2009 | Aikawa et al. | |
| 2009/0163313 A1 | 6/2009 | Gassmann et al. | |
| 2009/0270217 A1 * | 10/2009 | Zohrer | B60K 23/04 475/225 |
| 2010/0151982 A1 | 6/2010 | Waksmundzki | |
| 2010/0151983 A1 | 6/2010 | Ziech et al. | |
| 2011/0123264 A1 | 5/2011 | Wang | |
| 2012/0024614 A1 | 2/2012 | Sigmund et al. | |
| 2012/0204664 A1 | 8/2012 | Peura et al. | |

(56) References Cited

U.S. PATENT DOCUMENTS

| | | |
|---|---|---|
| 2013/0303323 A1 | 11/2013 | Zink et al. |
| 2014/0274544 A1 | 9/2014 | Downs et al. |
| 2014/0342866 A1 | 11/2014 | Valente et al. |
| 2015/0033909 A1 | 2/2015 | Campbell |
| 2015/0053046 A1 | 2/2015 | Ibusuki |
| 2015/0057897 A1 | 2/2015 | Stoiber et al. |
| 2015/0314679 A1 | 11/2015 | Rode et al. |
| 2016/0039284 A1 | 2/2016 | Osborn et al. |

FOREIGN PATENT DOCUMENTS

| | | |
|---|---|---|
| DE | 1555366 A1 | 10/1970 |
| DE | 07106774 U | 5/1971 |
| DE | 02132412 A1 | 1/1972 |
| DE | 03132443 A1 | 2/1983 |
| DE | 19713211 A1 | 12/1997 |
| DE | 10209166 A1 | 9/2003 |
| DE | 102012206143 A1 | 10/2013 |
| EP | 1348589 A2 | 10/2003 |
| GB | 00881308 A | 11/1961 |
| JP | S60-084472 A | 5/1985 |
| JP | H06-117518 A | 4/1994 |
| JP | 2001010304 A | 1/2001 |
| JP | 2006182242 A | 7/2006 |
| JP | 2011063224 A | 3/2011 |
| WO | WO-2010123964 A1 | 10/2010 |
| WO | WO-2014151287 A1 | 9/2014 |

\* cited by examiner

MODULAR DISCONNECTING DRIVE MODULE WITH TORQUE VECTORING AUGMENTATION

FIELD

The present disclosure relates to a modular disconnecting drive module with torque vectoring augmentation.

BACKGROUND

This section provides background information related to the present disclosure which is not necessarily prior art.

U.S. Pat. Nos. 6,041,904, 6,098,770 and 6,854,571 are examples of drive modules that employ a pair of friction clutches instead of a geared differential mechanism for supplying propulsive power to a pair of vehicle wheels. Such configurations can be advantageous, for example, when the drive module is to be provided with torque vectoring capabilities. While such drive modules are suited for their intended purpose, there remains a need in the art for an improved drive module.

SUMMARY

This section provides a general summary of the disclosure, and is not a comprehensive disclosure of its full scope or all of its features.

In one form, the present disclosure provides a drive module that includes a housing, an input pinion, a ring gear, a ring gear bearing, a clutch and first and second output shafts. The housing defines a central cavity, an input axis and an output axis that is transverse to the input axis. The input pinion is received in the central cavity and is rotatable about the input axis. The ring gear is received in the central cavity and is meshed with the input pinion. The ring gear bearing is mounted to the ring gear and the housing. The ring gear bearing supports the ring gear for rotation relative to the housing about the output axis. The clutch is received in the central cavity and includes a clutch input, which is coupled to the ring gear for rotation therewith, first and second clutch outputs, which are rotatable about the output axis, a clutch pack separator, which is disposed along the output axis between the first and second clutch outputs, first and second clutch packs, and first and second apply pistons. The clutch pack separator is coupled to the clutch input for rotation therewith, the first clutch pack having first and second clutch plates that are interleaved together. The first clutch plates are non-rotatably but axially slidably coupled to the clutch input. The second clutch plates are non-rotatably but axially slidably coupled to the first clutch output. The second clutch pack has third and fourth clutch plates that are interleaved together. The third clutch plates are non-rotatably but axially slidably coupled to the clutch input. The fourth clutch plates are non-rotatably but axially slidably coupled to the second clutch output. The first apply piston is disposed axially between the clutch plate separator and the first clutch pack. The second apply piston is disposed axially between the clutch plate separator and the second clutch pack. The first output shaft is coupled to the first clutch output for rotation therewith about the output axis. The second output shaft is coupled to the second clutch output for rotation therewith about the output axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
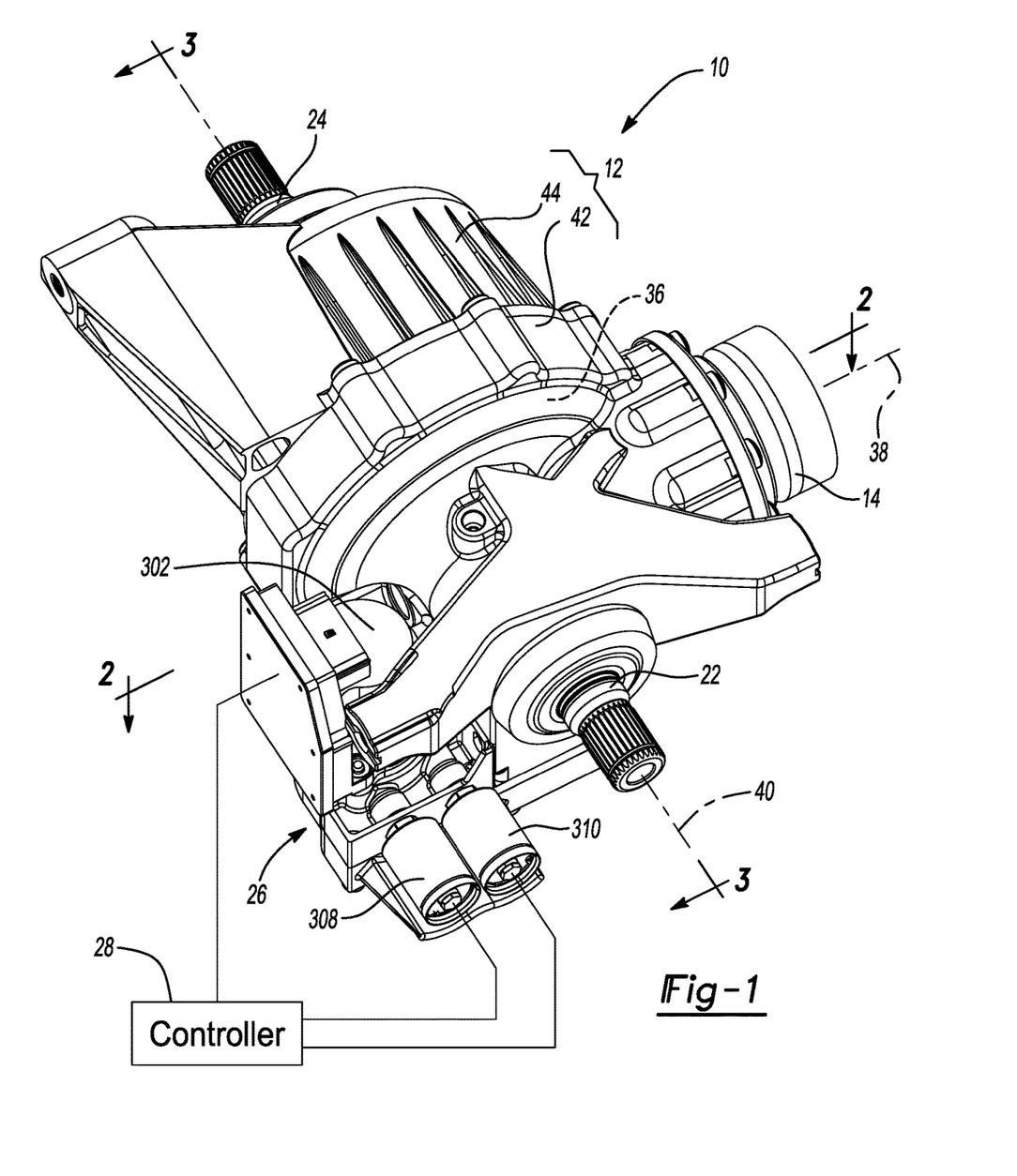
FIG. 1 is a perspective view of an exemplary drive module constructed in accordance with the teachings of the present disclosure.
Figure 2:
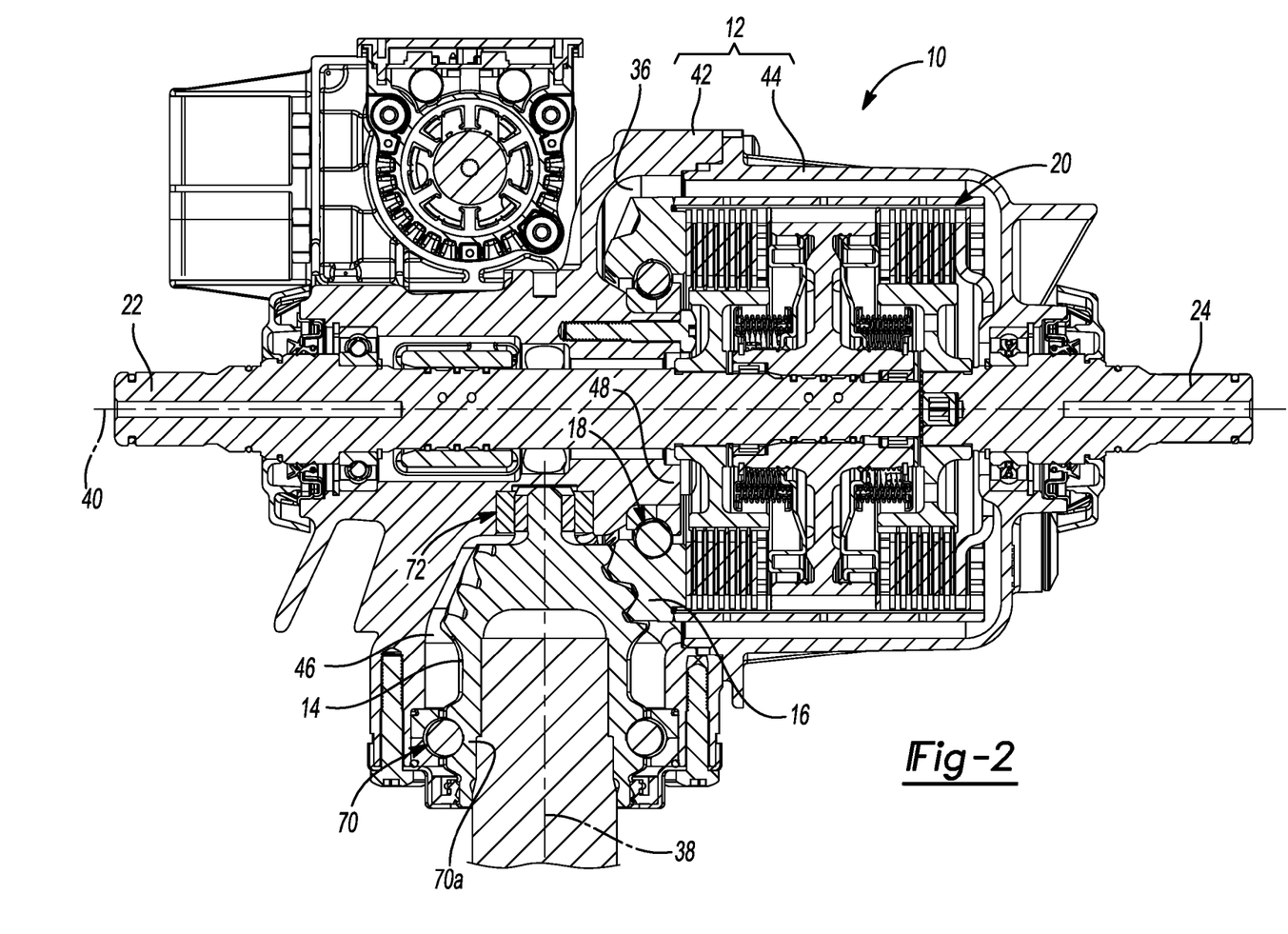
FIG. 2 is a sectional view of the drive module of FIG. 1 taken along the line 2-2 of FIG. 1.
Figure 3:
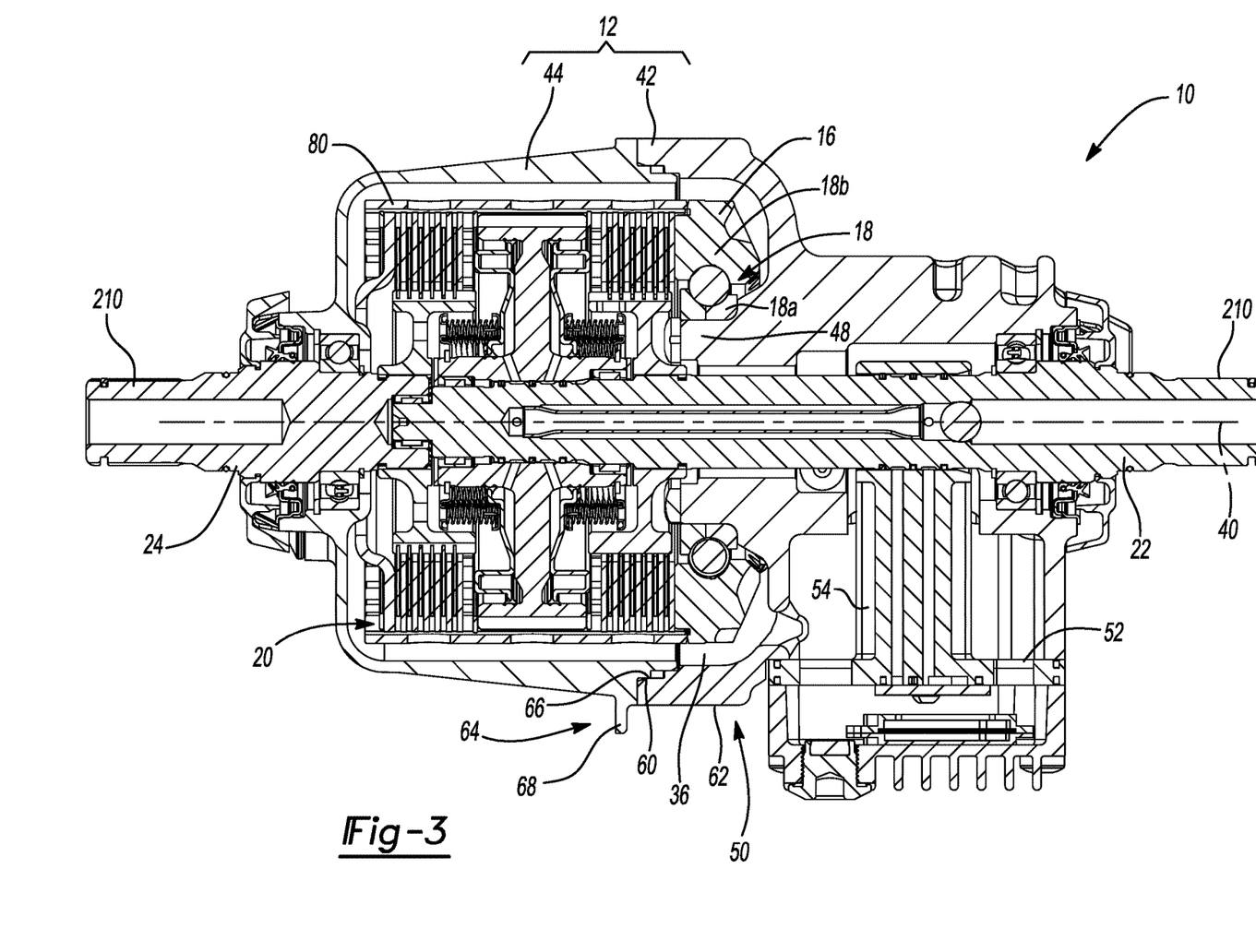
FIG. 3 is a sectional view taken along the line 3-3 of FIG. 1.

With reference to FIGS. 1 through 3, a drive module constructed in accordance with the teachings of the present disclosure is generally indicated by reference numeral 10. The drive module 10 can include a housing 12, an input pinion 14, a ring gear 16, a ring gear bearing 18, a clutch 20 and first and second output shafts 22 and 24, respectively, a hydraulic supply 26 and a controller 28.

The housing 12 can define a central cavity 36, an input axis 38 and an output axis 40 that is transverse to the input axis 38. The housing 12 can have first and second housing members 42 and 44 that are axially separable from one another along the output axis 40. The first housing member 42 can define an input pinion cavity 46, which can be disposed about the input axis 38 and intersect the central cavity 36, an annular shoulder 48, which is disposed concentrically about the output axis 40, a first coupling portion 50, a distribution block flange 52, and a stem receiving cavity 54. The first coupling portion 50 can include a pilot bore 60, which can be cylindrically shaped and disposed concentrically about the output axis 40, and a first flange member 62 that can be disposed about the pilot bore 60. The first flange member 62 includes a plurality of threaded apertures (not specifically shown). The distribution block flange 52 can be a flat planar surface that is formed onto the first housing member 42 about the stem receiving cavity 54.

The stem receiving cavity 54 can be formed through the distribution block flange 52 and can intersect the central cavity 36. The second housing member 44 can define a second coupling portion 64 that can matingly engage the first coupling portion 50. In the example provided, the second coupling portion 64 include a pilot member 66, which can be received into the pilot bore 60 in a desired manner (e.g., slip fit or line-to-line fit), and a second flange member 68 that can be fixedly coupled via bolts (not shown) that are received through the second flange member 68 and threaded to the threaded apertures in the first flange member 62. A seal (not specifically shown) can be disposed between the first and second coupling portions 50 and 64.

The input pinion 14 can be disposed in the central cavity 36 and can extend through the input pinion cavity 46. The input pinion 14 can be supported by one or more pinion bearings for rotation about the input axis 38. In the example provided, the input pinion 14 is supported for rotation via a bearing 70, such as a four point angular contact bearing, that is configured to transmit thrust loads between the housing 12 and the input pinion 14 in both axial directions along the input axis 38. The input pinion 14 can be further supported relative to the housing 12 via a straddle bearing 72, which can be a roller bearing or a ball bearing. The straddle bearing 72 has radial load capabilities and no or limited (relative to the four point angular contact bearing 70) capability to handle thrust loads between the housing 12 and the input pinion 14. In the example provided, the inner bearing race 70a of the four point angular contact bearing 70 is integrally and unitarily formed with the input pinion 14.

The ring gear 16 is received in the central cavity 36 and is meshingly engaged with the input pinion 14 so as to be rotatable about the output axis 40. In the example provided, the input pinion 14 and the ring gear 16 are hypoid gears, but it will be appreciated that they could be configured differently.

The ring gear bearing 18 is mounted to the ring gear 16 and the shoulder 48 on the first housing member 42 and supports the ring gear 16 for rotation relative to the housing 12 about the output axis 40. The ring gear bearing 18 is configured to transmit thrust loads between the housing 12 and the ring gear 16 in both axial directions along the output axis 40. In the particular example provided, the ring gear bearing 18 is a four point angular contact bearing having an inner race 18a, which is mounted to the shoulder 48 formed on the first housing member 42, and an outer race 18b that is integrally and unitarily formed with the ring gear 16.

Figure 4:
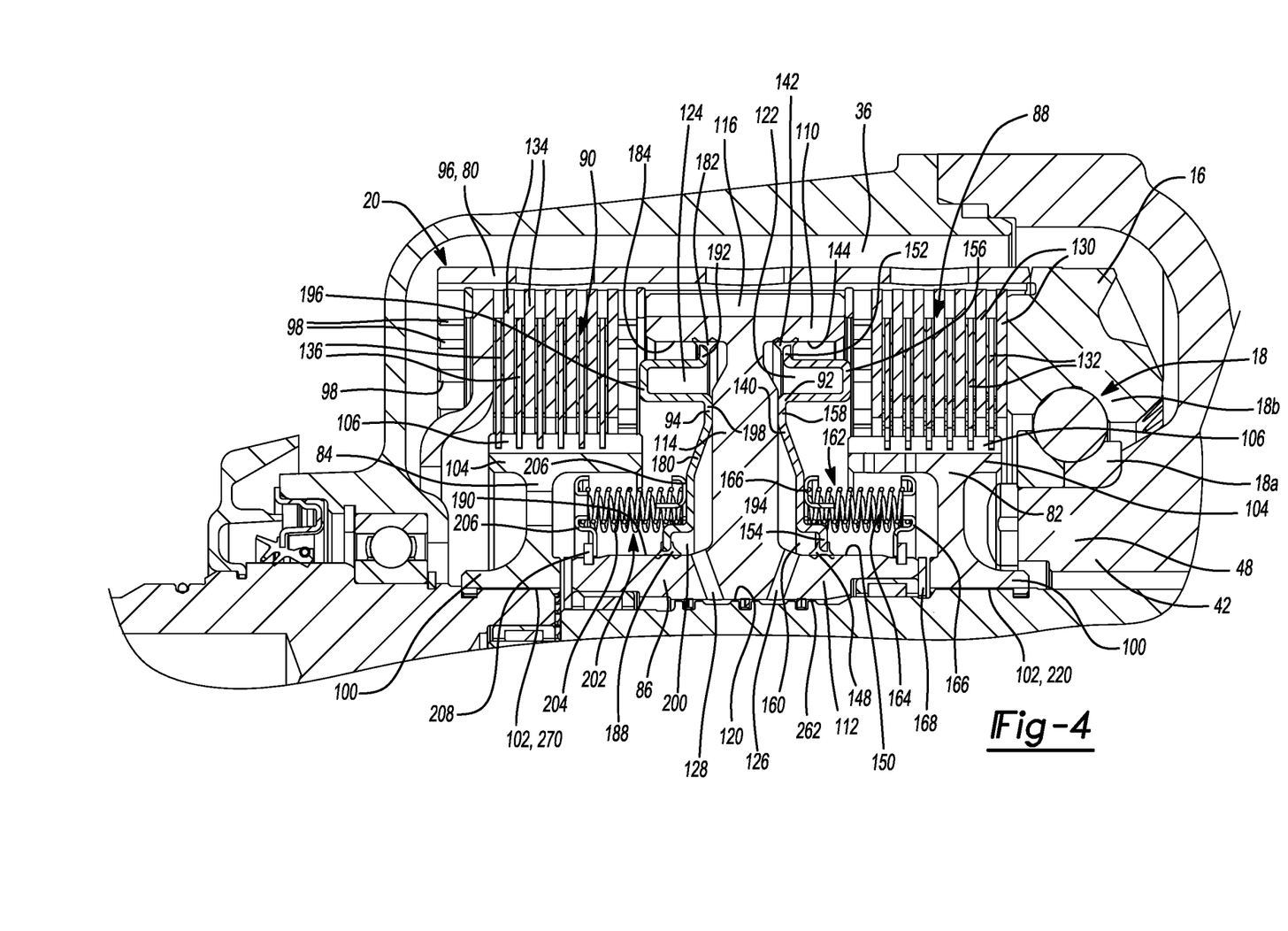
FIG. 4 is an enlarged portion of FIG. 3, illustrating a clutch in more detail.

With reference to FIG. 4, the clutch 20 is received in the central cavity 36 and includes a clutch input 80, first and second clutch outputs 82 and 84, respectively, a clutch pack separator 86, first and second clutch packs 88 and 90, respectively, and first and second apply pistons 92 and 94, respectively. The clutch input 80 is coupled to the ring gear 16 for rotation therewith. In the example provided, the clutch input 80 is an outer clutch basket having an annular wall member 96 that defines a set of spline teeth 98 that are disposed about the inside circumferential surface of the annular wall member 96.

The first and second clutch outputs 82 and 84 are spaced apart from one another along the output axis 40 and are rotatable relative to one another as well as the clutch input 80 about the output axis 40. Each of the first and second clutch outputs 82 and 84 includes a hub portion 100, which can define an internally-splined aperture 102, and an inner plate mount 104 that can be a sleeve-like structure that can extend from the hub portion 100 and which can include a plurality of external splines 106 that can be disposed about the circumference of the inner plate mount 104.

The clutch pack separator 86 can include an annular outer wall 110, a hollow hub 112 and a radial wall 114 that extends radially between the outer wall 110 and the hub 112. The outer wall 110 can define a plurality of spline teeth 116 (only one shown) that can non-rotatably but axially slidably engage with the spine teeth 98 on the annular wall member 96 of the clutch input 80. Accordingly, it will be appreciated that the clutch pack separator 86 is rotatably coupled to the clutch input 80. The hub 112 can be disposed concentrically within the outer wall 110 and defines a hub aperture 120. The radial wall 114 divides the clutch pack separator 86 into first and second annular chambers 122 and 124, respectively, that are disposed on opposite sides of the radial wall 114. First and second supply apertures 126 and 128 can be formed through the hub 112 on opposite sides of the radial wall 114.

The first clutch pack 88 has first and second clutch plates 130 and 132, respectively, that are interleaved together. The first clutch plates 130 have an externally splined circumference that is matingly received into the annular wall member 96 of the clutch input 80 so that the externally splined circumference of the first clutch plates 130 non-rotatably but axially slidably engage the spline teeth 98 of the clutch input 80. The second clutch plates 132 have an internally splined aperture that matingly receives the external splines 106 on the outside circumference of the inner plate mount 104 to thereby non-rotatably but axially slidably couple the second clutch plates 132 to the first clutch output 82.

The second clutch pack 90 has third and fourth clutch plates 134 and 136, respectively, that are interleaved together. The third clutch plates 134 have an externally splined circumference that is matingly received into the annular wall member 96 of the clutch input 80 so that the externally splined circumference of the third clutch plates 134 non-rotatably but axially slidably engage the spline teeth 98 of the clutch input 80. The fourth clutch plates 136 have an internally splined aperture that matingly receives the external splines 106 on the outside circumference of the inner plate mount 104 to thereby non-rotatably but axially slidably couple the fourth clutch plates 136 to the second clutch output 84.

The first apply piston 92 can be disposed within the first annular chamber 122 axially between the clutch pack separator 86 and the first clutch pack 88. The first apply piston 92 can comprise an annular piston body 140, an outer peripheral seal 142, which can seal the piston body 140 to inside surface 144 of the outer wall 110 of the clutch pack separator 86, and an inner peripheral seal 148 that can seal the piston body 140 to the outside surface 150 of the hub 112 of the clutch pack separator 86. The piston body 140 can include a radially outer edge 152, a radially inner edge 154, an annular contact member 156, and a stop member 158. The radially outer edge 152 can be received in the annular outer wall 110 of the clutch pack separator 86, while the radially inner edge 154 can be received over the hollow hub 112 of the clutch pack separator 86. The outer peripheral seal 142 be coupled to (e.g., formed onto) the radially outer edge 152 and can be sealingly engaged to the annular outer wall 110. The inner peripheral seal 148 can be coupled to (e.g., formed onto) the radially inner edge 154 and can be sealingly engaged to the hub 112. The annular contact member 156 is configured to engage the first clutch pack 88 when fluid pressure drives the piston body 140 away from the radial wall 114 of the clutch pack separator 86. The stop member 158 can be disposed radially between the radially outer edge 152 and the radially inner edge 154 and is configured to contact the radial wall 114 of the clutch pack separator 86 to limit movement of the first apply piston 92 in a direction away from the first clutch pack 88. A first chamber 160 can be formed between the radial wall 114 of the clutch pack separator 86 and the piston body 140 of the first apply piston 92. The first chamber 160 can be in fluid communication with the first supply aperture 126.

A first return spring 162 can be disposed about the hollow hub 112 and can bias the first apply piston 92 away from the first clutch pack 88. In the example provided, the first return spring 162 comprises a plurality of helical coil compression springs 164 that are disposed concentrically about the hollow hub 112 between a pair of spring plates 166. A first one of the spring plates 166 abuts the piston body 140 of the first apply piston 92, while the other one of the spring plates 166 abuts an external retaining ring 168 that is mounted to the hollow hub 112.

The second apply piston 94 can be disposed within the second annular chamber 124 axially between the clutch pack separator 86 and the second clutch pack 90. The second apply piston 94 can comprise an annular piston body 180, an outer peripheral seal 182, which can seal the piston body 180 to an inside surface 184 of the outer wall 110 of the clutch pack separator 86, and an inner peripheral seal 188 that can seal the piston body 180 to the outside surface 190 of the hub 112 of the clutch pack separator 86. The piston body 180 can include a radially outer edge 192, a radially inner edge 194, an annular contact member 196, and a stop member 198. The radially outer edge 192 can be received in the annular outer wall 110 of the clutch pack separator 86, while the radially inner edge 194 can be received over the hollow hub 112 of the clutch pack separator 86. The outer peripheral seal 182 be coupled to (e.g., formed onto) the radially outer edge 192 and can be sealingly engaged to the annular outer wall 110. The inner peripheral seal 188 can be coupled to (e.g., formed onto) the radially inner edge 194 and can be sealingly engaged to the hub 112. The annular contact member 196 is configured to engage the second clutch pack 90 when fluid pressure drives the piston body 180 away from the radial wall 114 of the clutch pack separator 86. The stop member 198 can be disposed radially between the radially outer edge 192 and the radially inner edge 194 and is configured to contact the radial wall 114 of the clutch pack separator 86 to limit movement of the second apply piston 94 in a direction away from the second clutch pack 90. A second chamber 200 can be formed between the radial wall 114 of the clutch pack separator 86 and the piston body 180 of the second apply piston 94. The second chamber 200 can be in fluid communication with the second supply aperture 128.

A second return spring 202 can be disposed about the hollow hub 112 and can bias the second apply piston 94 away from the second clutch pack 90. In the example provided, the second return spring 202 comprises a plurality of helical coil compression springs 204 that are disposed concentrically about the hollow hub 112 between a pair of spring plates 206. A first one of the spring plates 206 abuts the piston body 180 of the second apply piston 94, while the other one of the spring plates 206 abuts an external retaining ring 208 that is mounted to the hollow hub 112.

Returning to FIG. 3, each of the first and second output shafts 22 and 24 is configured to transmit rotary power between a respective one of the first and second clutch outputs 82 and 84 and an associated vehicle wheel (not shown). In the example provided, the drive module 10 is suspended independently from a pair of wheels (not shown) that are driven by the drive module 10. As such, each of the first and second output shafts 22 and 24 includes a male splined shaft member 210 is configured to drivingly engage a constant velocity joint (not shown) of a half-shaft (not shown) that transmits rotary power between a respective one of the first and second clutch outputs 82 and 84 and an associated vehicle wheel.

Figure 5:
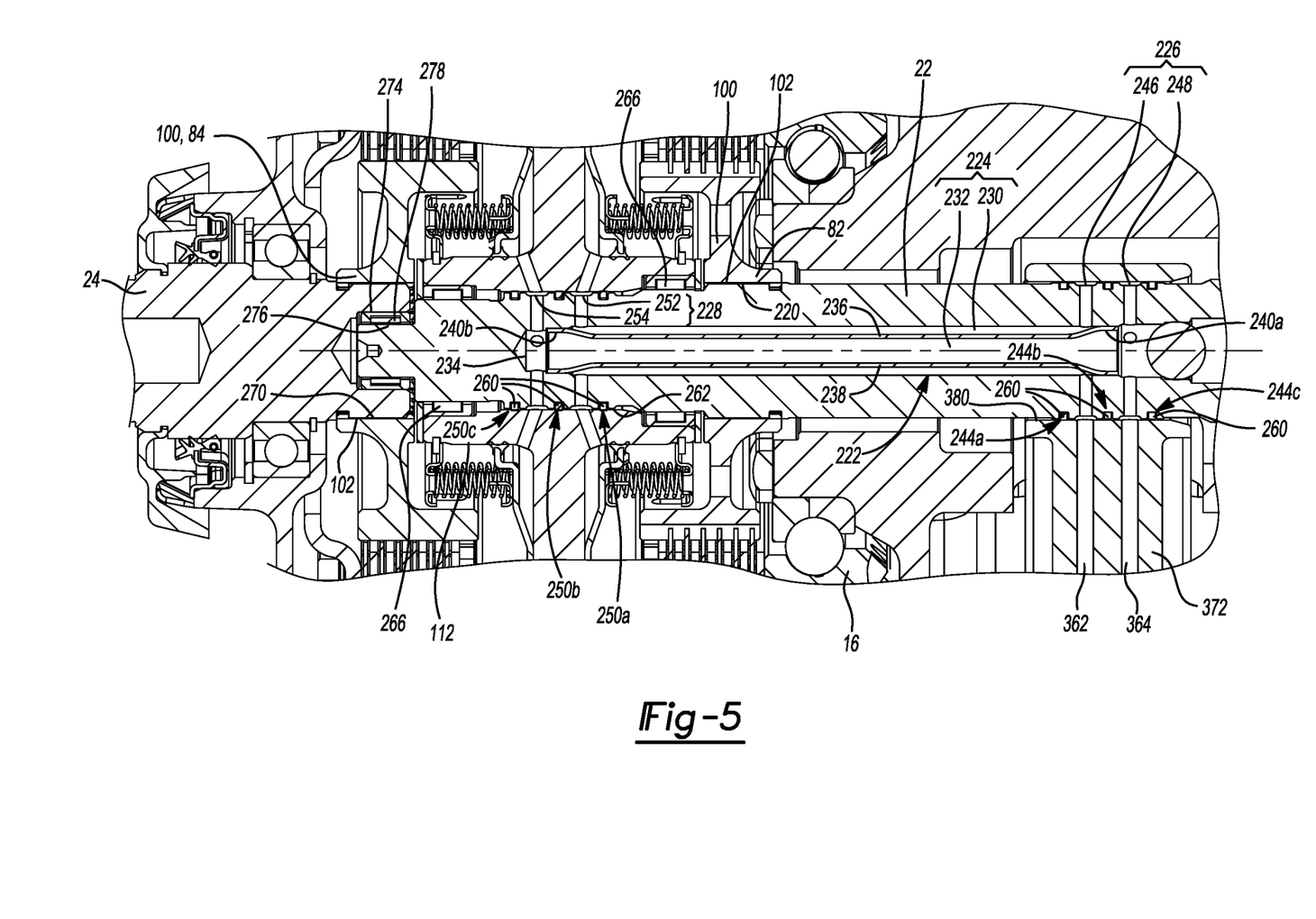
FIG. 5 is an enlarged portion of FIG. 3, illustrating the clutch, a first output shaft, and a stem of a distribution block in more detail.

With reference to FIG. 5, the first output shaft 22 can include a male splined segment 220 and a fluid distribution portion 222 having a fluid distribution section 224, a fluid inlet section 226 and a fluid outlet section 228. The male splined segment 220 can be received into the internally-splined aperture 102 in the hub portion 100 of the first clutch output 82 to non-rotatably but axially slidably couple the first output shaft 22 to the first clutch output 82.

The fluid distribution section 224 can comprise one of more channels or passages that extend longitudinally through the first output shaft 22 between the fluid inlet section 226 and the fluid outlet section 228. In the example provided, the fluid distribution section 224 comprises a first passage 230 and a second passage 232. The first passage 230 is a distribution conduit that can be defined in part by a longitudinal bore 234 that is formed through the first output shaft 22. The second passage 232 is a distribution conduit that can be defined in part by a tube 236 that is received into the longitudinal bore 234. The tube 236 can have a central portion 238, which is formed of a first diameter or cross-sectional area, and end sections 240a and 240b that are formed of a second diameter or cross-sectional area that is larger than that of the central portion 238. Each of the end sections 240a and 240b is sealingly engaged to the surface of the longitudinal bore 234. The first passage 230 extends axially between the end sections 240a and 240b of the tube, has an annular cross-sectional shape and is disposed radially between the tube 236 and the surface of the longitudinal bore 234. The second passage 232 includes the volume defined by the tube 236 and extends into the longitudinal bore 234 on sides of each of the end sections 240a and 240b that are opposite the second passage 232.

The fluid inlet section 226 can be spaced axially apart from the male splined segment 220 and can include one or more fluid inlets, which can be coupled in fluid communication with the fluid distribution section 224, and optionally one or more seal mounts 244a, 244b, and 244c. In the particular example provided, the fluid inlet section 226 includes three seal mounts 244a, 244b and 244c, a first fluid inlet 246 that is disposed between the seal mounts 244a and 244b, and a second fluid inlet 248 that is disposed between the seal mounts 244b and 244c. The first fluid inlet 246 can comprise one or more holes that are formed radially through the first output shaft 22 and which intersect the first passage 230. The second fluid inlet 248 can comprise one or more holes that are formed radially through the first output shaft 22 and which intersect the second passage 232.

The fluid outlet section 228 can include one or more fluid outlets, which can be coupled in fluid communication with the fluid distribution section 224, and optionally one or more seal mounts 250a, 250b, and 250c. In the particular example provided, the fluid outlet section 228 includes three seal mounts 250a, 250b and 250c, a first fluid outlet 252 that is disposed between the seal mounts 250a and 250b, and a second fluid outlet 254 that is disposed between the seal mounts 250b and 250c. The first fluid outlet 252 can comprise one or more holes that are formed radially through the first output shaft 22 and which intersect the first passage 230. The first fluid outlet 252 can be in fluid communication with the first supply aperture 126. The second fluid outlet 254 can comprise one or more holes that are formed radially through the first output shaft 22 and which intersect the second passage 232. The second fluid outlet 254 can be in fluid communication with the second supply aperture 128.

Appropriate seals, such as O-rings 260, can be received on each of the seal mounts 244a, 244b, 244c, 250a, 250b and 250c. The O-rings 260 on the seal mounts 250a, 250b and 250c can each form a seal between the first output shaft 22 and the inside diametrical surface of the hub aperture 262 in the hub 112 of the clutch pack separator 86. If desired, bearings, such as a pair of needle bearings 266, can be disposed on opposite axial sides of the fluid outlet section 228 and can support the first output shaft 22 for rotation within the hub 112 of the clutch pack separator 86.

The second output shaft 24 can be configured in a conventional manner and can include a male splined segment 270 that can be received within and meshingly engage the internally-splined aperture 102 of the hub portion 100 of the second clutch output 84 to thereby rotatably couple the second output shaft 24 to the second clutch output 84. One of the first and second output shafts 22 and 24 can include a bearing bore 274 and the other one of the first and second output shafts 22 and 24 can include a shaft segment 276. An appropriate bearing, such as a needle bearing 278, can be received between the shaft segment 276 and the bearing bore 274. In the particular example provided, the shaft segment 276 is formed on the first output shaft 22 and the bearing bore 274 is formed in the second output shaft 24.

Figure 6:
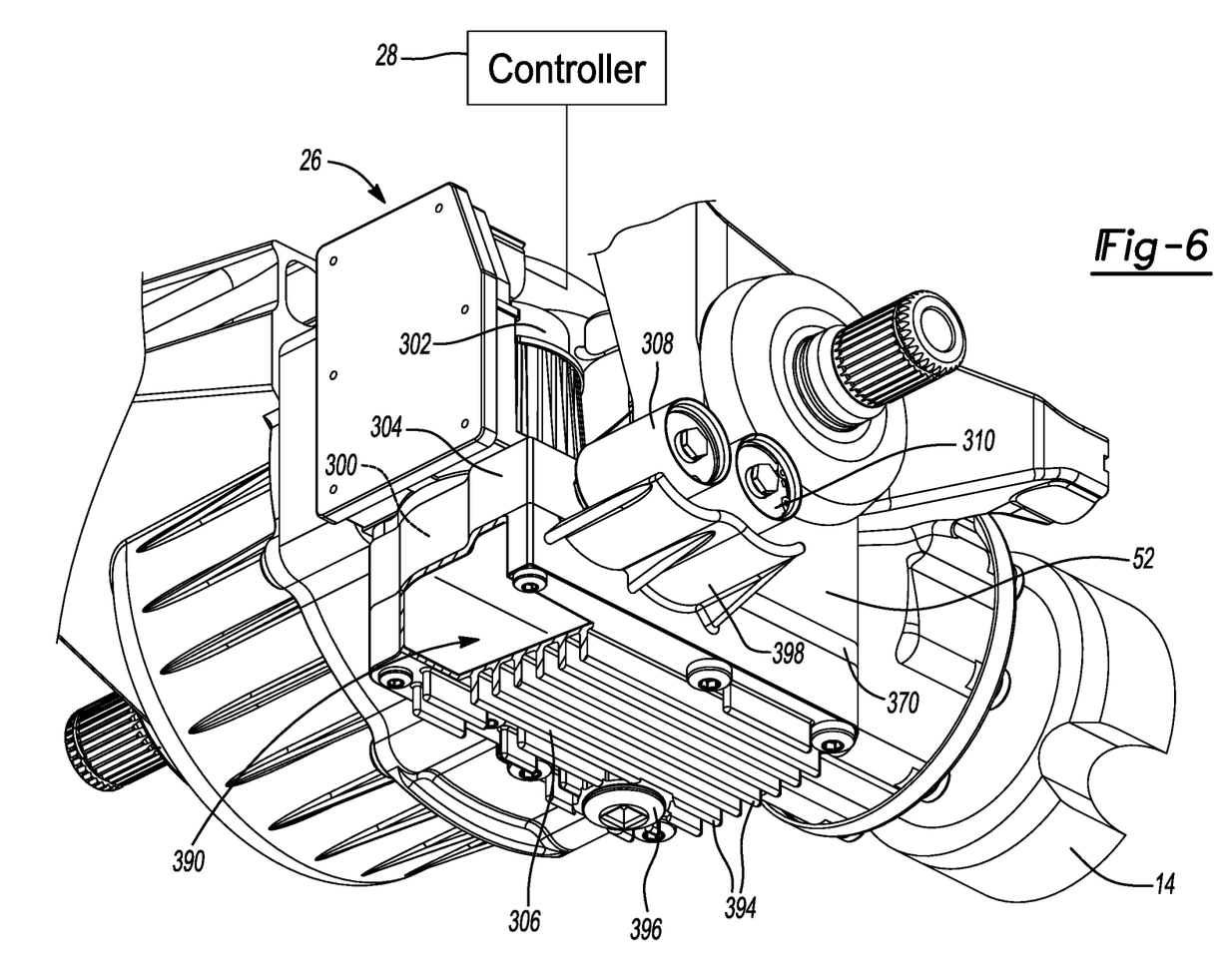
FIG. 6 is a perspective view of a portion of the drive module of FIG. 1, the view depicting a cover of a hydraulic supply in a partly fragmented manner to permit a reservoir inside the cover to be shown.
Figure 7:
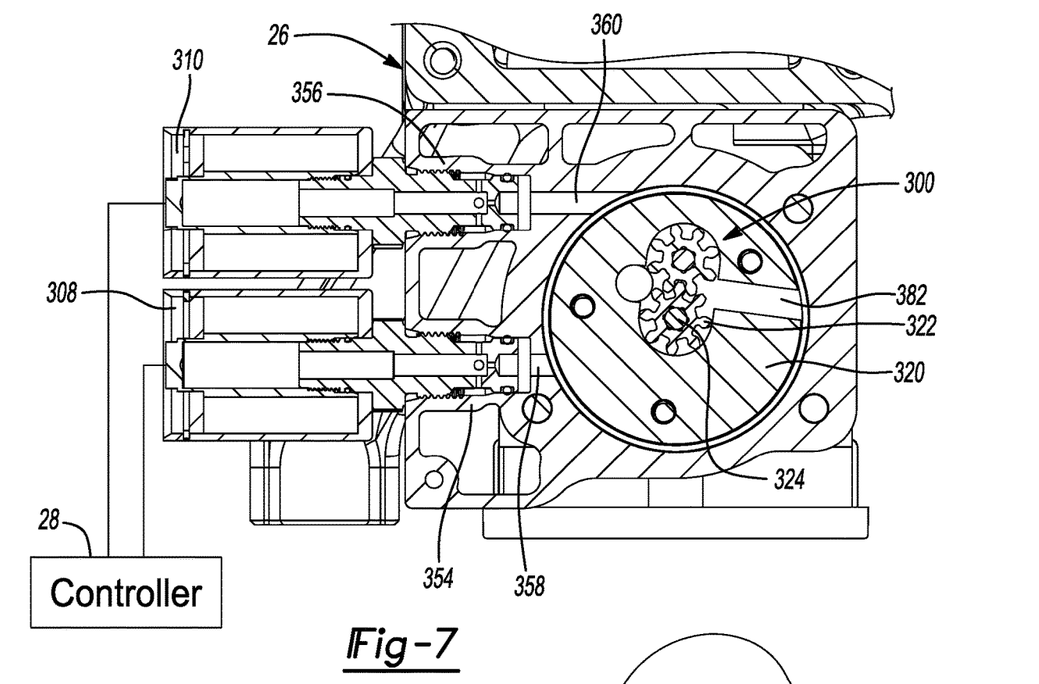
FIG. 7 is a section view of a portion of the drive module of FIG. 1, the view illustrating a pump and first and second control valves of the hydraulic supply.

With reference to FIGS. 6 and 7, the hydraulic supply 26 can include a pump 300, an electric motor 302, a distribution block 304, a cover 306, first and second control valves 308 and 310, respectively. The electric motor 302 can operate in response to a motor control signal generated by the controller 28. The pump 300 can be any type of fluid pump, such as a gear pump, and can have a pump housing 320 and a pump input member 322. The pump housing 320 can be fixedly coupled to the electric motor 302, while the pump input member 322 can be drivingly coupled to an output member 324 of the electric motor 302.

With reference to FIGS. 7 through 10, the distribution block 304 can define a distribution block structure 350, a motor/pump mount 352, first and second valve mounts 354 and 356, respectively, first and second feed conduits 358 and 360, respectively, first and second intermediate conduits 362 and 364, respectively. The distribution block structure 350 can include a base 370 and a stem 372. The base 370 is configured to sealingly engage (via a gasket that is not specifically shown) the distribution block flange 52 on the first housing member 42. The base 370 can define one or more drain apertures 378 that are disposed within an area where the base 370 is sealingly engaged to the distribution block flange 52. The drain apertures 378 can extend through the base 370. The stem 372 can be fixedly coupled to and project from a side of the base 370 that faces the distribution block flange 52. The stem 372 can be disposed within an area where the base 370 is sealingly engaged to the distribution block flange 52 and can define an output shaft aperture 380. The stem 372 is received into the stem receiving cavity 54 (FIG. 5) and the first output shaft 22 (FIG. 5) is received through the output shaft aperture 380.

The motor/pump mount 352 is configured to receive the pump 300 and is configured to fluidly couple a fluid outlet 382 of the pump 300 to the first and second feed conduits 358 and 360. The first and second valve mounts 354 and 356 are configured to mechanically couple the first and second control valves 308 and 310, respectively to the base 370. In the example provided, the first valve mount 354 includes a threaded aperture that is in fluid communication with the first feed conduit 358 and the second valve mount 356 includes a threaded aperture that is in fluid communication with the second feed conduit 360. Accordingly, the first feed conduit 358 extends between the fluid outlet 382 of the pump 300 and the first valve mount 354, while the second feed conduit 360 extends between the fluid outlet 382 of the pump 300 and the second valve mount 356. The first intermediate conduit 362 can extend from the first valve mount 354 through the base 370 and through the stem 372 where it can intersect the output shaft aperture 380. Similarly, the second intermediate conduit 364 can extend from the second valve mount 356 through the base 370 and through the stem 372 where it can intersect the output shaft aperture 380 at a location that is spaced apart from the first intermediate conduit 362. In the example provided, the first and second intermediate conduits 362 and 364 are partly formed by grooves that are formed in the distribution block structure 350; a cover plate 386 is secured to the distribution block structure 350 to seal the open side of the grooves in the distribution block structure 350.

Figure 8:
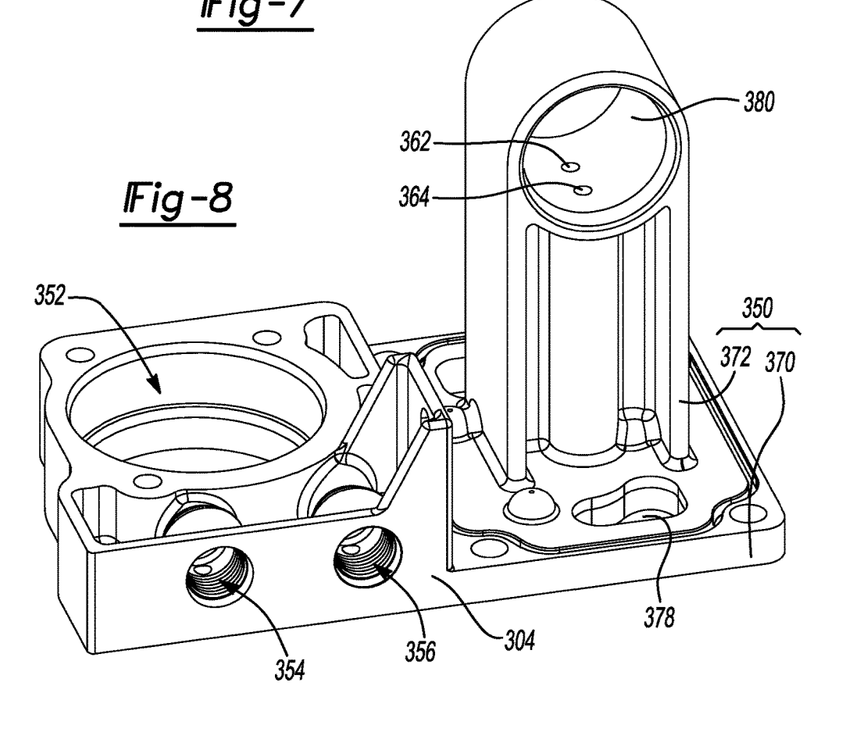
FIG. 8 is a perspective view of a portion of the hydraulic supply, the view illustrating a distribution block.

With reference to FIGS. 5 and 8, the O-rings 260 that are received on each of the seal mounts 244a, 244b, and 244c can form seals between the first output shaft 22 and a circumferential surface of the output shaft aperture 380 so that the first intermediate conduit 362 is in fluid communication with the first fluid inlet 246 and the second intermediate conduit 364 is in fluid communication with the second fluid inlet 248.

Returning to FIG. 6, the cover 306 can be coupled to the distribution block 304 on a side of the distribution block 304 opposite the distribution block flange 52. The cover 306 can define a fluid reservoir 390 that can be in fluid communication with a pump inlet 392 (FIG. 10) of the pump 300 and the drain apertures 378 (FIG. 10) in the base 370. If desired, the cover 306 can include a plurality of cooling fins 394, which promote the rejection of heat to the air around the cover 306, an oil drain plug 396, which permits the fluid in the reservoir 390 to be drained, and a shroud 398 that shields the underside of the first and second control valves 308 and 310 from debris that may be kicked up during operation of the drive module.

Figure 9:
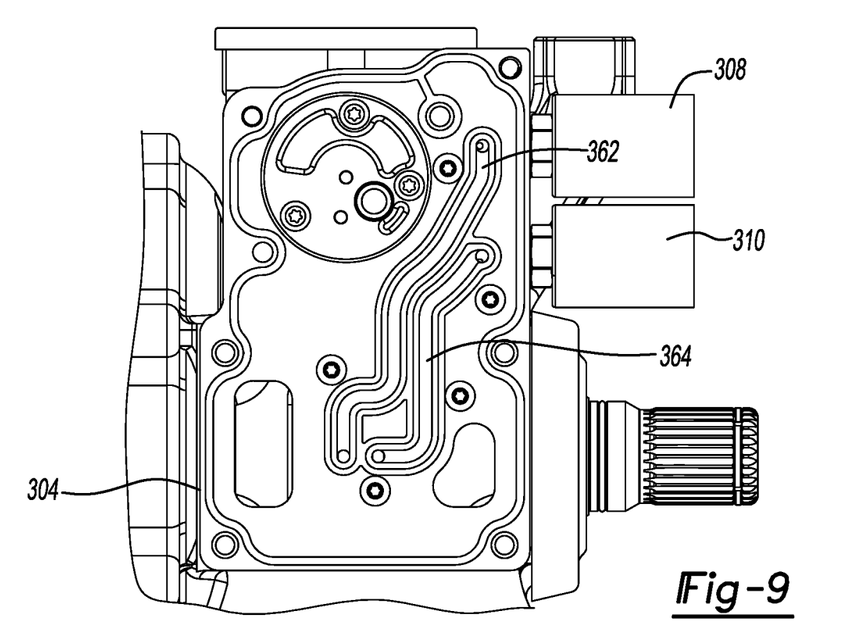
FIG. 9 is a bottom plan view of a portion of the drive module of FIG. 1 illustrating the distribution block of the hydraulic supply in more detail.
Figure 10:
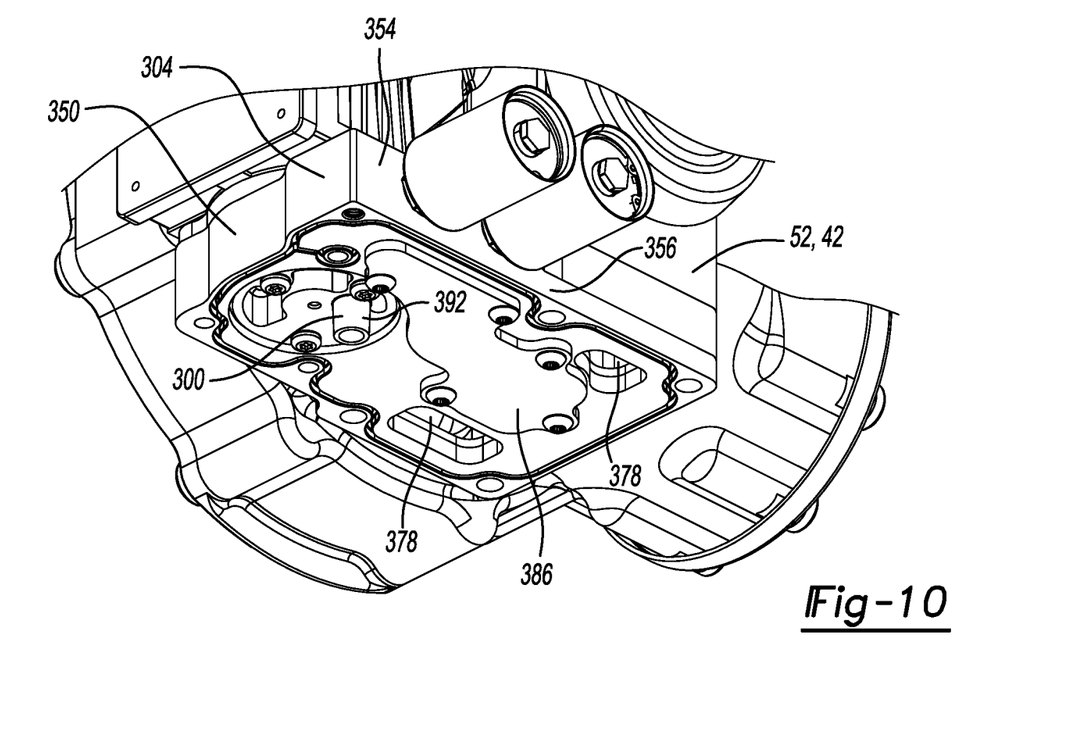
FIG. 10 is a perspective view of a portion of the drive module of FIG. 1 illustrating the distribution block of the hydraulic supply in more detail.

With reference to FIGS. 7 and 9, the first and second control valves 308 and 310 can be any type of valve for controlling fluid communication between the first and second feed conduits 358 and 360, respectively, and the first and second intermediate conduits 362 and 364, respectively. In the example provided, the first and second control valves 308 and 310 are normally closed, solenoid operated valves that can be selectively opened to permit pressurized fluid in the first and second feed conduits 358 and 360, respectively, to flow into the first and second intermediate conduits 362 and 364, respectively. The first and second control valves 308 and 310 can be responsive to first and second valve control signals that are generated by the controller 28 and transmitted to the first and second control valves 308 and 310, respectively.

Returning to FIGS. 1, 3 and 6, a power source (not shown), such as an internal combustion engine or an electric motor, can provide rotary power to the input pinion 14 to cause the input pinion 14 to drive the ring gear 16 about the output axis 40. The controller 28 can operate the electric motor 302 to drive the pump 300 such that the pump 300 draws fluid from the reservoir 390 and supplies pressurized fluid that is transmitted through the first and second feed conduits 358 and 360 (FIG. 7) to the first and second control valves 308 and 310, respectively. It will be appreciated that fluid drawn from the reservoir 390 into the pump 300 can pass through a filter (not shown).

With reference to FIGS. 1, 4 and 5, the controller 28 can operate the first and second control valves 308 and 310 to supply pressurized fluid to the first and second chambers 160 and 200, respectively. In this regard, pressurized fluid discharged through the first control valve 308 is transmitted (in sequence) through the first intermediate conduit 362, out of the distribution block stem 372 into the first fluid inlet 246 in the fluid inlet section 226 of the first output shaft 22, through the first passage 230 and the first fluid outlet 252, out of the first output shaft 22 and through the first supply aperture 126 in the hub 112. Similarly, pressurized fluid discharged through the second control valve 310 is transmitted (in sequence) through the second intermediate conduit 364, out of the distribution block stem 372 into the second fluid inlet 248 in the fluid inlet section 226 of the first output shaft 22, through the second passage and the second fluid outlet 254, out of the first output shaft 22 and through the second supply aperture 128 in the hub 112. Pressurized fluid in the first and second chambers 160 and 200 can urge the first and second apply pistons 92 and 94, respectively, toward the first and second clutch packs 88 and 90, respectively, to thereby compress the first and second clutch packs 88 and 90, respectively. It will be appreciated that the magnitude of the torque that can be transmitted between the ring gear 16 and each of the first and second output shafts 22 and 24 is at least partly dependent upon the magnitude of the force exerted by the first and second apply pistons 92 and 94, respectively, to the first and second clutch packs 88 and 90, respectively. It will also be appreciated that the first and second control valves 308 and 310 could be operated differently so that the forces exerted on the first and second clutch packs 88 and 90, respectively, are different. The application of different forces to the first and second clutch packs 88 and 90 could be employed, for example, to permit a difference in rotational speed between the first and second output shafts 22 and 24.

If desired, the reduction ratio or speed ratio of the input pinion 14 and the ring gear 16 can be selected to drive the clutch input 80 at a rotational speed than a desired rotational speed of the first and second output shafts 22 and 24. Accordingly, the controller 28 can operate the first and second control valves 308 and 310 such that the force exerted by the first and second apply pistons 92 and 94, respectively, to the first and second clutch packs 88 and 90, respectively, permits a desired amount of relative rotation between the clutch input 80 and the first and second output shafts 22 and 24, respectively. Stated another way, the controller 28 can operate the first and second control valves 308 and 310 to limit the torque that is output from the clutch 20 to the first and second output shafts 22 and 24 to drive the first and second output shafts 22 and 24 at a rotational speed that is relatively slower than the rotational speed of the clutch input 80. Configuration of the reduction ratio or speed ratio of the input pinion 14 and the ring gear 16 in this manner provides a torque-vectoring capability in which an additional amount of speed and torque can be applied to one of the first and second output shafts 22 and 24 and a lesser amount of speed and torque can be applied to the other one of the first and second output shafts 22 and 24.

In a first alternative, a single one of the first and second control valves 308 and 310 could be employed to control the fluid pressure that acts on the first and second apply pistons 92 and 94, for example if a) the first and second intermediate conduits 362 and 364 (FIG. 9) were to be coupled in fluid communication, and/or b) the first and second fluid inlets 246 and 248 (FIG. 5) were to be coupled in fluid communication, and/or c) the first and second passages 230 and 232 (FIG. 5) were to be coupled in fluid communication, and/or d) the first and second fluid outlets 252 and 254 (FIG. 5) were to be coupled in fluid communication, and/or d) the first and second supply apertures 126 and 128 (FIG. 4) were to be coupled in fluid communication, and/or e) the first and second chambers 160 and 200 (FIG. 4) were to be coupled in fluid communication. In a second alternative, the first and second control valves 308 and 310 could be omitted and the electric motor 302 could be controlled by the controller 28 to control the fluid pressure that acts on the first and second apply pistons 92 and 94 (FIG. 4).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drive module comprising:
   a housing defining a central cavity, an input axis and an output axis that is transverse to the input axis;
   an input pinion received in the central cavity and rotatable about the input axis;
   a ring gear received in the central cavity and meshed with the input pinion, the ring gear having a plurality of teeth and a toe, the toe being located at a radially inner end of the teeth;
   a ring gear bearing mounted to the ring gear and the housing, the ring gear bearing supporting the ring gear for rotation relative to the housing about the output axis;
   a clutch received in the central cavity, the clutch having a clutch input, which is coupled to the ring gear for rotation therewith, first and second clutch outputs, which are rotatable about the output axis, a clutch pack separator, which is disposed along the output axis between the first and second clutch outputs, first and second clutch packs, and first and second apply pistons, the clutch pack separator being coupled to the clutch input for rotation therewith, the first clutch pack having first and second clutch plates that are interleaved together, the first clutch plates being non-rotatably but axially slidably coupled to the clutch input, the second clutch plates being non-rotatably but axially slidably coupled to the first clutch output, the second clutch pack having third and fourth clutch plates that are interleaved together, the third clutch plates being non-rotatably but axially slidably coupled to the clutch input, the fourth clutch plates being non-rotatably but axially slidably coupled to the second clutch output, the first apply piston being disposed axially between the clutch plate separator and the first clutch pack, the second apply piston being disposed axially between the clutch plate separator and the second clutch pack;
   a first output shaft coupled to the first clutch output for rotation therewith about the output axis; and
   a second output shaft coupled to the second clutch output for rotation therewith about the output axis;
   wherein an outer diameter of the first clutch pack and an outer diameter of the second clutch pack are larger than a diameter of the toe of the ring gear, and wherein an inner diameter of the first clutch pack and an inner diameter of the second clutch pack are smaller in diameter than an outer bearing race of the ring gear bearing.

2. The drive module of claim 1, wherein the housing has first and second housing members that are axially separable from one another along the output axis.

3. The drive module of claim 1, wherein the first apply piston is sealingly engaged to the clutch plate separator.

4. The drive module of claim 3, wherein the clutch plate separator defines an annular chamber in which the first apply piston is received.

5. The drive module of claim 3, wherein the second apply piston is sealingly engaged to the clutch plate separator.

6. The drive module of claim 5, wherein the clutch plate separator defines first and second annular chambers, the first apply piston being received in the first annular chamber, the second apply piston being received in the second annular chamber.

7. The drive module of claim 1, wherein the clutch plate separator comprises a hollow hub that is disposed concentrically about a portion of one of the first and second output shafts, wherein a first supply aperture is formed radially through the hub, the first supply aperture being adapted to fluidly couple a first chamber between the clutch plate separator and the first apply piston to a source of pressurized fluid.

8. The drive module of claim 7, wherein the hub is sealingly engaged to the one of the first and second output shafts, and wherein a first distribution conduit is disposed in the one of the first and second output shafts, the first distribution conduit being coupled in fluid communication to the first supply aperture.

9. The drive module of claim 8, further comprising a distribution block having a base and a stem that extends from the base, the stem extending into the central cavity in the housing and defining a shaft aperture through which the one of the first and second output shafts is received through, the stem being sealingly engaged to the one of the first and second output shafts and having a first intermediate conduit that is coupled in fluid communication to the first distribution conduit in the one of the first and second output shafts.

10. The drive module of claim 9, wherein the distribution block includes a pump mount to which a pump is coupled, the pump being configured to supply a pressurized fluid to the first intermediate conduit.

11. The drive module of claim 10, further comprising a first control valve mounted to the distribution block and disposed in a first fluid path between the pump and an end of the first intermediate conduit that intersects the shaft aperture.

12. The drive module of claim 11, wherein a second distribution conduit is disposed in the one of the first and second output shafts, wherein a second supply aperture is formed radially through the hub, the second supply aperture fluidly couples the second distribution conduit to a second chamber between the clutch plate separator and the second apply piston, wherein the stem has a second intermediate conduit that is coupled in fluid communication to the second distribution conduit in the one of the first and second output shafts, and wherein the drive module further comprises a second control valve mounted to the distribution block and disposed in a second fluid path between the pump and an end of the second intermediate conduit that intersects the shaft aperture.

13. The drive module of claim 9, wherein a second distribution conduit is disposed in the one of the first and second output shafts, wherein a second supply aperture is formed radially through the hub, the second supply aperture fluidly couples the second distribution conduit to a second chamber between the clutch plate separator and the second apply piston, wherein the stem has a second intermediate conduit that is coupled in fluid communication to the second distribution conduit in the one of the first and second output shafts.

14. The drive module of claim 9, wherein the housing defines a stem receiving cavity that extends between the central cavity and an external surface of the housing, the stem receiving cavity extending perpendicular to the output axis, wherein the base is abutted against the external surface.

15. The drive module of claim 8, wherein a second distribution conduit is disposed in the one of the first and second output shafts, wherein a second supply aperture is formed radially through the hub, the second supply aperture fluidly couples the second distribution conduit to a second chamber between the clutch plate separator and the second apply piston.

16. The drive module of claim 7, wherein a second supply aperture is formed radially through the hub, the second supply aperture being adapted to fluidly couple a second chamber between the clutch plate separator and the second apply piston to the source of pressurized fluid.

* * * * *